May 2, 1944.  L. J. EYLER ET AL  2,347,896

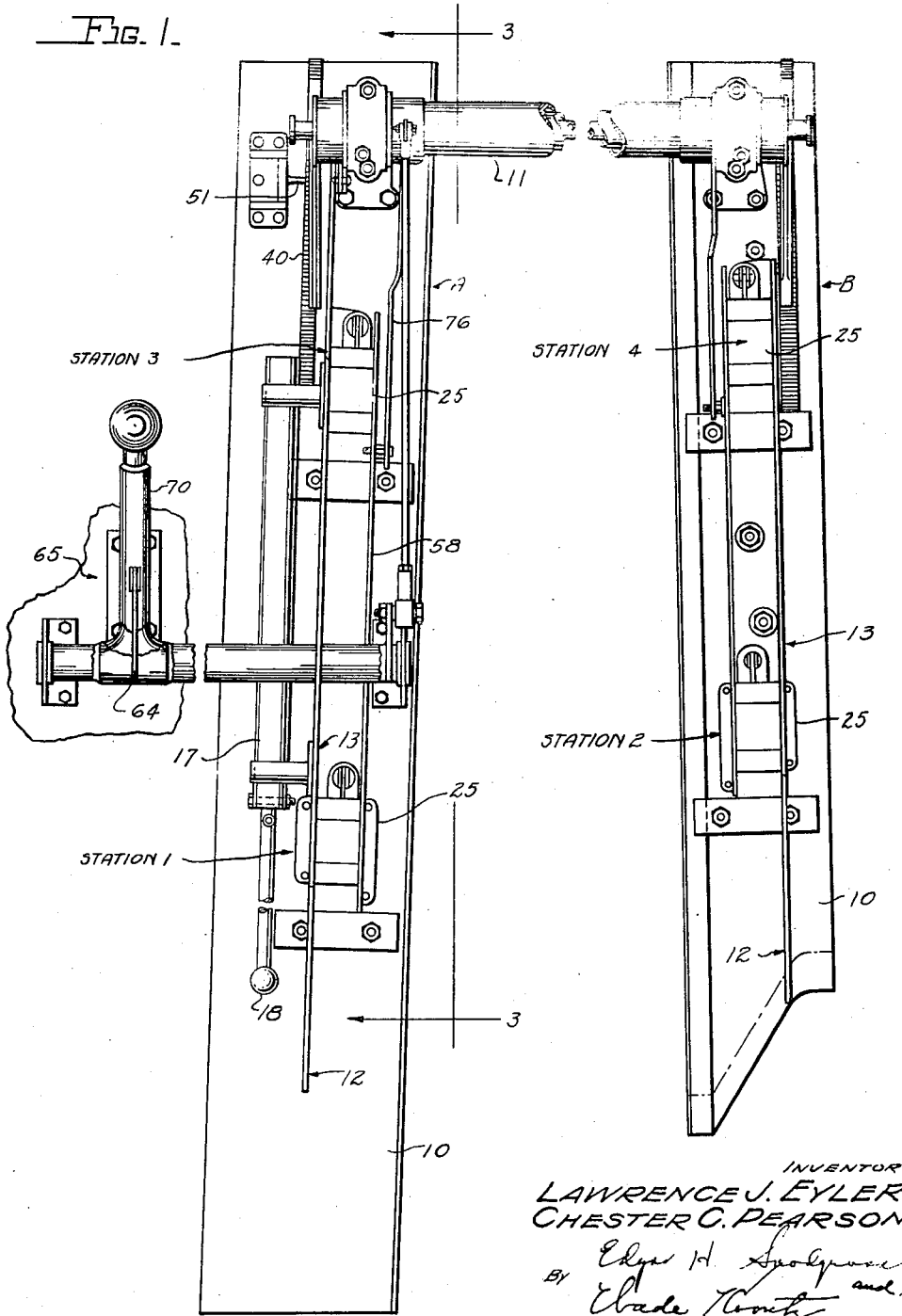

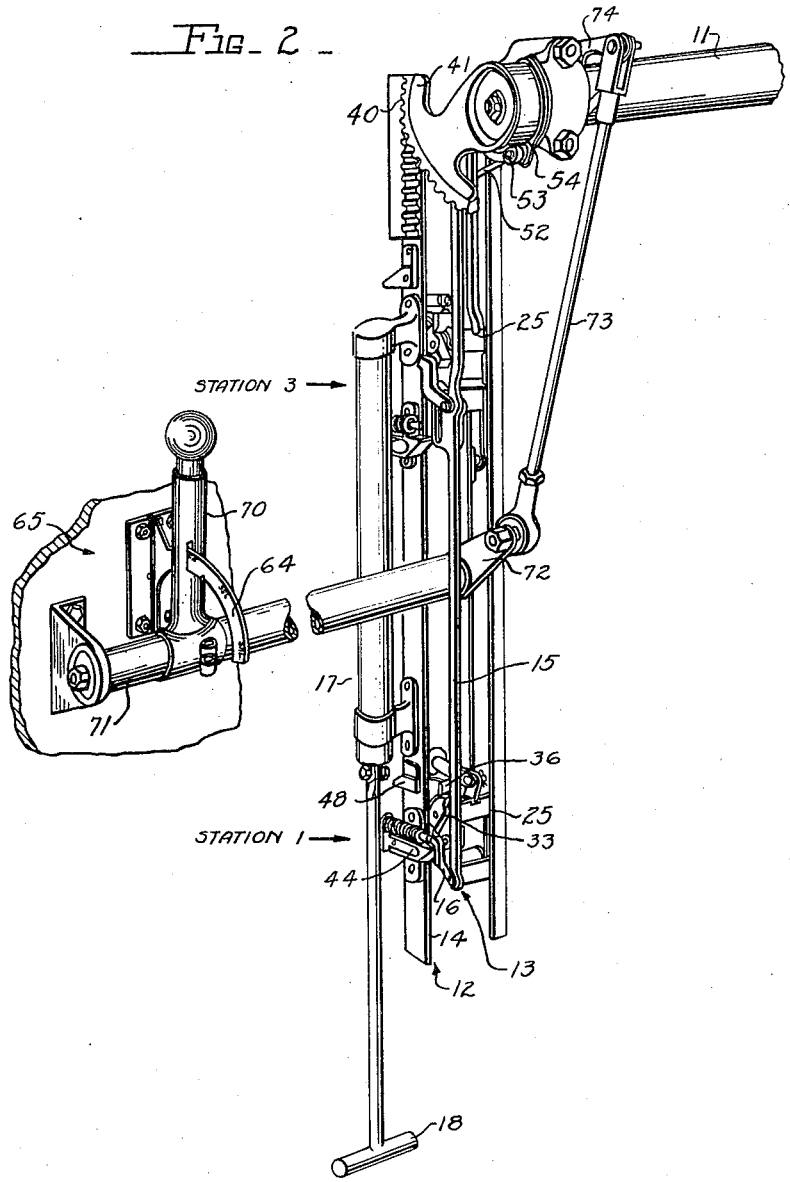

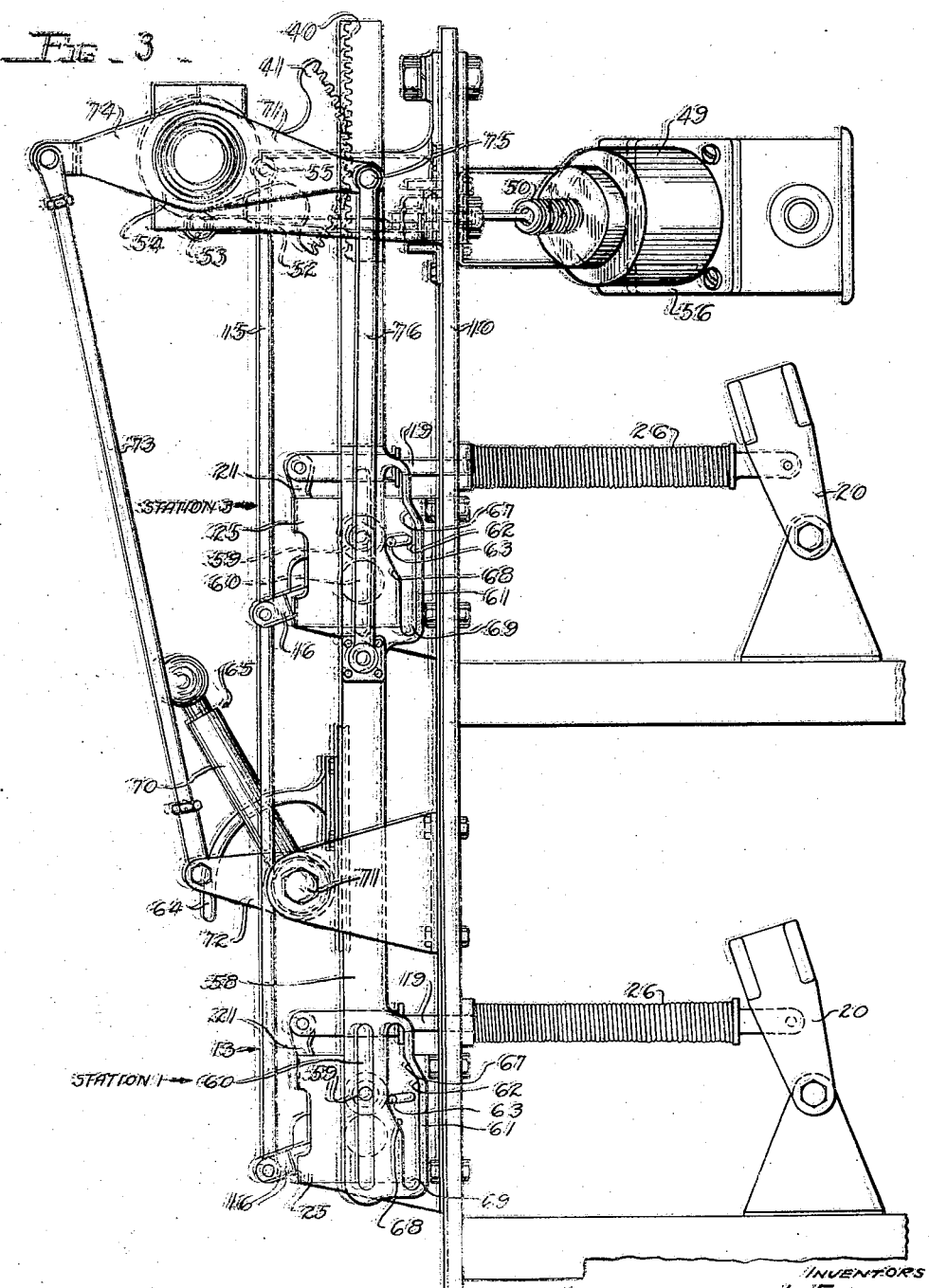

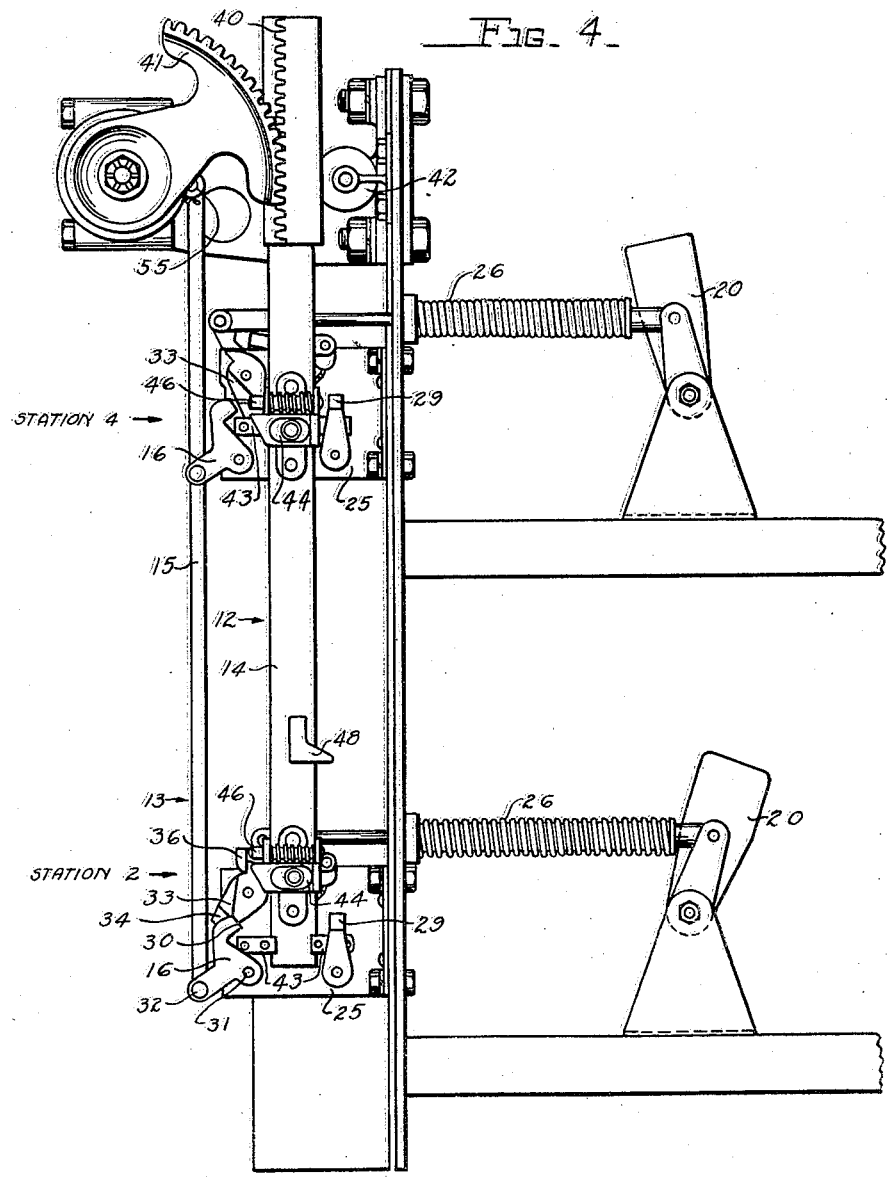

BOMB RACK

Filed Oct. 18, 1939  7 Sheets-Sheet 5

INVENTORS
LAWRENCE J. EYLER
CHESTER C. PEARSON
BY
ATTORNEYS

May 2, 1944. L. J. EYLER ET AL 2,347,896
BOMB RACK
Filed Oct. 18, 1939 7 Sheets-Sheet 6
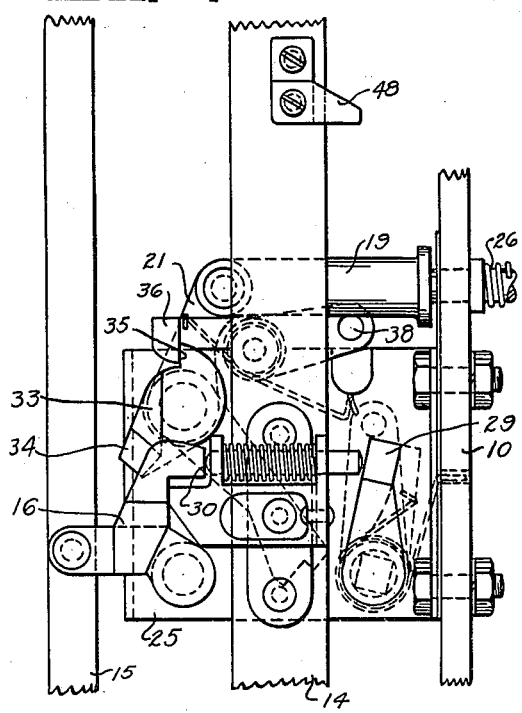
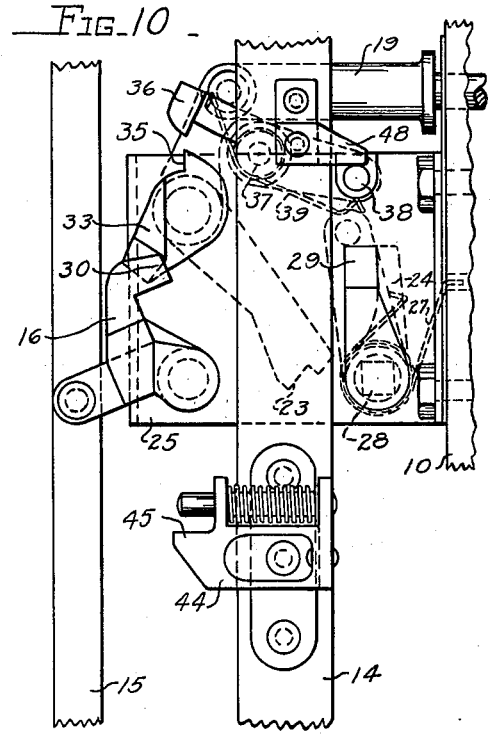
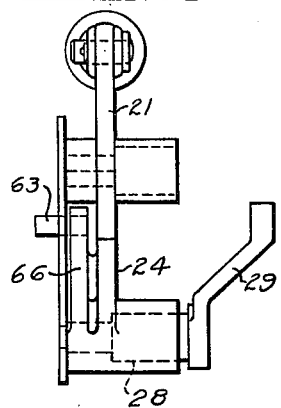
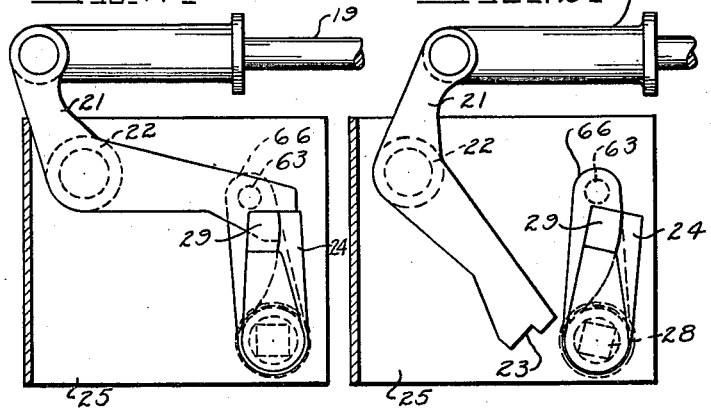
INVENTORS
LAWRENCE J. EYLER
CHESTER C. PEARSON
ATTORNEYS

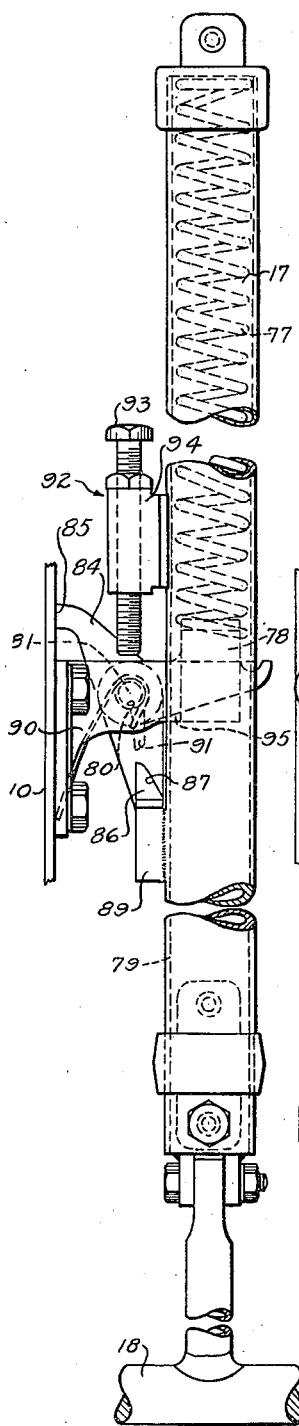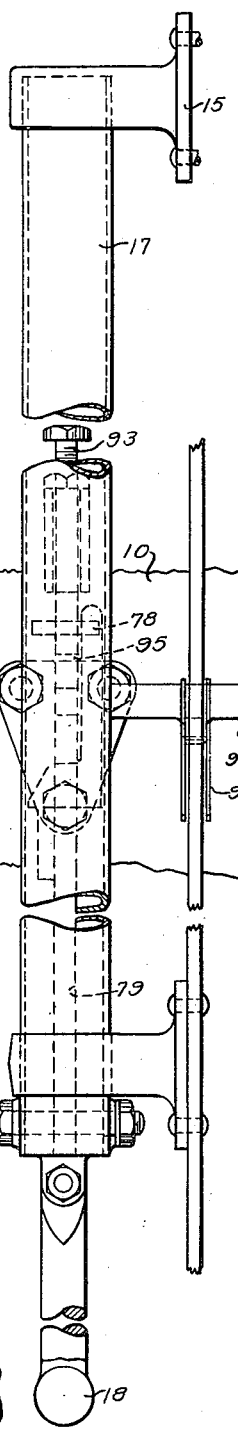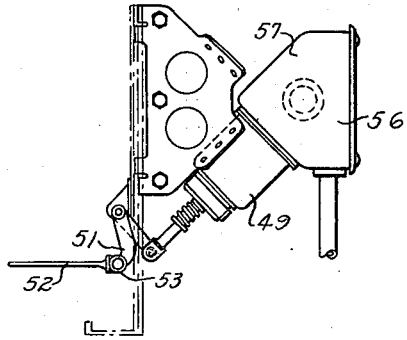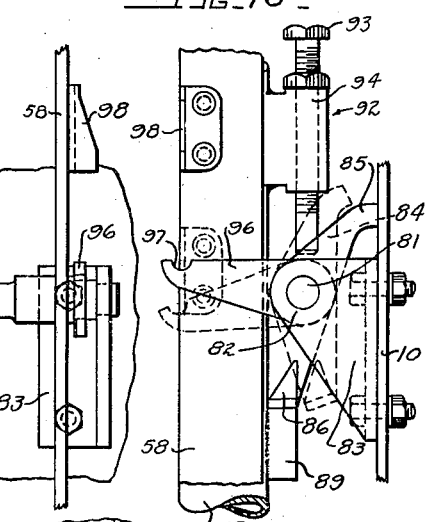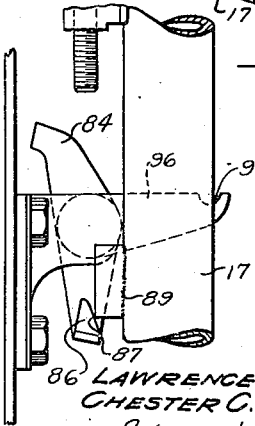

Patented May 2, 1944

2,347,896

UNITED STATES PATENT OFFICE 2,347,896

BOMB RACK

Lawrence J. Eyler, Dayton, Ohio, and Chester C. Pearson, Santa Monica, Calif.

Application October 18, 1939, Serial No. 300,054

18 Claims. (Cl. 89—1.5)

This invention relates to mechanisms for the release of bombs from aircraft, and particularly to mechanisms for the successive release of bombs from a plurality of stations in a progressive order.

It is an object of our invention to provide, in a multiple station bomb rack, having a release mechanism at each station actuable into cocked and uncocked positions and having a means common to all the stations for conditioning cocked stations for release and having a tripping means common to all stations for releasing said cocked and conditioned stations, to provide means to prevent the cocking of any station until the conditioning means is placed in an initial, inoperative position in advance of the position for the conditioning of the first station in the rack.

It is another object of our invention to provide, in a multiple station bomb rack of the above-said type, means for holding said station conditioning means in said initial position.

It is still another object of our invention to provide, in a multiple station bomb rack of the above-said type having means for simultaneously locking all stations against release or tripping, and having means for holding said station conditioning means in said initial position, means operatively associated with said locking means to simultaneously loose said station conditioning means from said inoperative position during the locking operation of said locking means.

It is also an object of our invention to provide, in a multiple station bomb rack of the above-said type, a novel means at each station for preventing the cocking of all released stations when the station selector means is in operative relationship to any station, and a novel means for the conditioning of a bomb station for release.

Other objects and advantages of our invention will appear from the following description and drawings, wherein like numerals designate like elements throughout the several views:

Figure 1 is a front elevation view of our bomb rack, constructed with two vertically arranged hangers and four bomb stations;

Figure 2 is a perspective view of the left-hand hanger and the manual control, with the No. 1 station shown conditioned for release;

Figure 3 is a side elevation view, taken on the line 3—3 of Figure 1;

Figure 4 is a side elevation view of the right-hand hanger shown in Figure 1, with the No. 4 station cocked and conditioned for release, and the No. 2 station released;

Figure 9 is an elevation view, showing the same mechanism in the releasing position;

Figure 10 is an elevation view, showing the station mechanism in the released position, and showing the relative position of the station selector bar in its initial, or inoperative, position, wherein the station anti-cocking mechanism is rendered ineffective;

Figure 11 is a schematic view of the station link and latch mechanism in the cocked position;

Figure 12 is a schematic view of the same mechanism in the released position;

Figure 13 is an end view of Figure 11;

Figure 14 is a left-side elevation view of the cocking bar and its latch arrangement;

Figure 15 is a front elevation view of the same, together with the associated operating structure. In this view, the spring shown in Figure 14 is omitted;

Figure 16 is a right-side elevation of a fragmentary portion of the same mechanism;

Figure 17 is a fragmentary portion of the view in Figure 14, showing the cocking bar latch sear in camming operation.

Figure 18 is a top plan view of the solenoid and linkage to the solenoid tripping bar, a side elevation of which is seen assembled in Figure 3.

Figure 8:
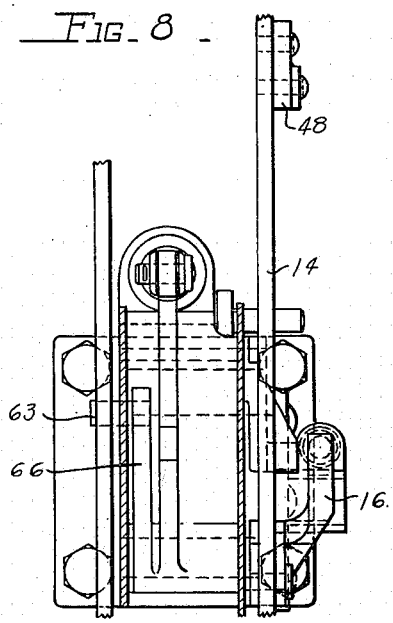
Figure 8 is an end elevation of the same view.

Referring to the drawings, our novel bomb rack is shown in Figure 1, comprising two vertically arranged hangers A and B, supported by a framework generally indicated by the numeral 10. Each hanger, as illustrated, contains two stations, 1 and 3 being on the left-hand hanger A, and 2 and 4 on the right-hand hanger B. The two hangers are connected by a torque tube assembly or transverse control bar 11 to operate as one unit. The general assembly of the various parts of the bomb rack is further shown in Figures 2, 3 and 4, wherein it will be seen that each station comprises means for releasing the bomb to be carried thereby, said releasing means being individually operated by a station selector means 12 in conjunction with a tripping means 13, or simultaneously by a salvo means, more fully hereinafter described. Said selector means as illustrated comprises generally a bar 14 in common with each station in a hanger and a number of means corresponding in number to the number of stations in said hanger for conditioning for release each cocked station in succession. The tripping means 13, as illustrated, includes a bar 15 operatively connected to a trigger 16 at each station. To the station selector bar 14 on the left hanger, as shown, is rigidly attached a housing 17, also called the cocking bar, containing a compression spring mounted in fixed relation with the framework 10 and so arranged as to urge the station selector and conditioning bar in an upward direction as more fully shown in Figure 14. To the bottom of the housing 17 is positively connected a handle 18 for cocking the bar in an initial lowermost position.

Before undertaking the detailed description and arrangement of the various general parts and assembly of the rack, it is preferred at this time to describe the detail structure of the cocking and releasing mechanism of an individual bomb station, in order that the action and cooperation of the various parts of the bomb rack will be more fully appreciated in relation to their functions.

The latch and cooperating elements of the releasing mechanism of each station are shown in Figures 11, 12 and 13, and comprise a link rod 19 for attaching at one end to a release lever 20 (shown in Figures 3 and 4) for the bomb shackle (not shown), and at the other end to a latch engaging arm 21 pivoted on a journal 22. The latch engaging arm 21 is provided with a notch 23 for engagement with a latch 24 in the cocked position, as shown in Figure 11, and in Figure 12 is shown in the released or tripped position.

In Figures 5 to 10, inclusive, this latch mechanism is shown in the complete assembly at each bomb station in a mounting or "trigger" box 25 rigidly attached to the framework 10, in which is pivotally mounted the journal 22 for the latch engaging arm 21. In the cocked position, the release lever is swung to the left (as shown at station 4 in Figure 4), in which position it compresses a tension spring 26 and causes the latch engaging arm 21 to swing so that its notched end 23 will engage the latch 24 actuated by the spring 27, the latch being rigidly attached to a journal 28 pivotally mounted in the box 25. On the same journal on which the latch 24 is mounted, there is rigidly mounted on the outside of the box, a trip arm 29 which swings with the latch. Its swinging end is in alignment with the hammer end 30 of the trigger 16 pivotally connected to the station box at 31 and also pivotally connected to the tripping bar 15 by the pin 32. On the same journal to which the latch engaging arm 21 is attached is rigidly mounted on the outside of the box 25 and on the same side as the trip arm 29, a lug 33, said lug being provided with a projecting shoulder 34 for a purpose hereinafter described, and with a notch 35 which is adapted to be engaged by a hook 36 when the release lever 20 is in an uncocked position as shown at station 2 in Figure 4, thereby preventing the cocking of the station so long as the hook is engaged. The hook 36 is pivotally mounted in the station box 25 at 37 intermediate of its ends, and is provided on its opposite end with a transversely protruding pin 38 crossing the plane of the station selector bar. A spring 39 actuates the hook 36 to engage the notch 35 of the lug 33.

Figure 7:
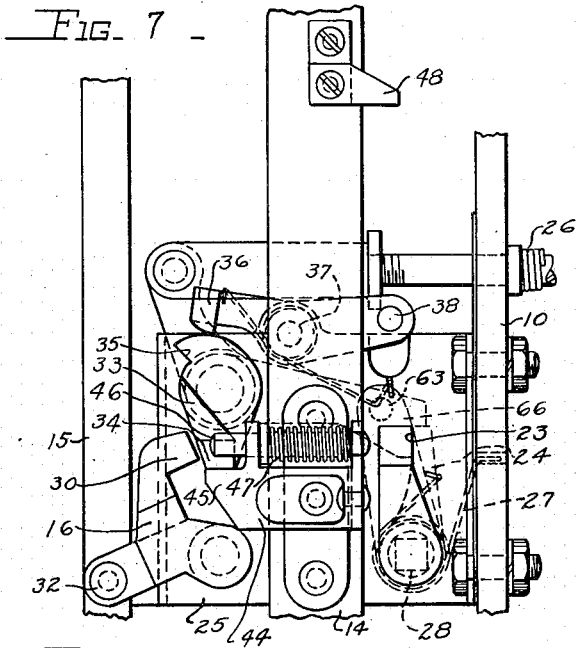
Figure 7 is an elevation view showing the mechanism of the same station in the position conditioned for release.
Figure 6:
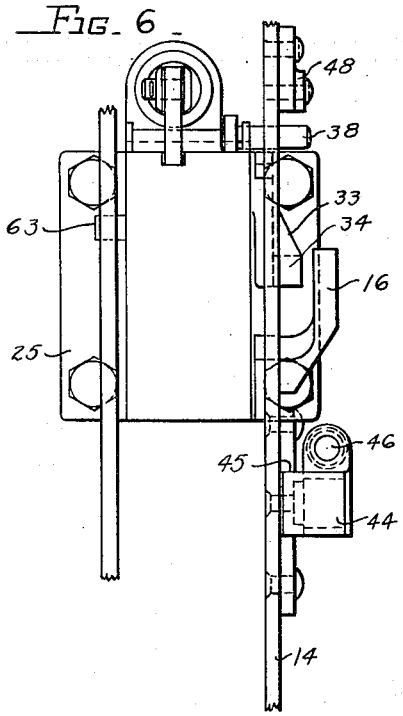
Figure 6 is an end elevation of the same view.
Figure 5:
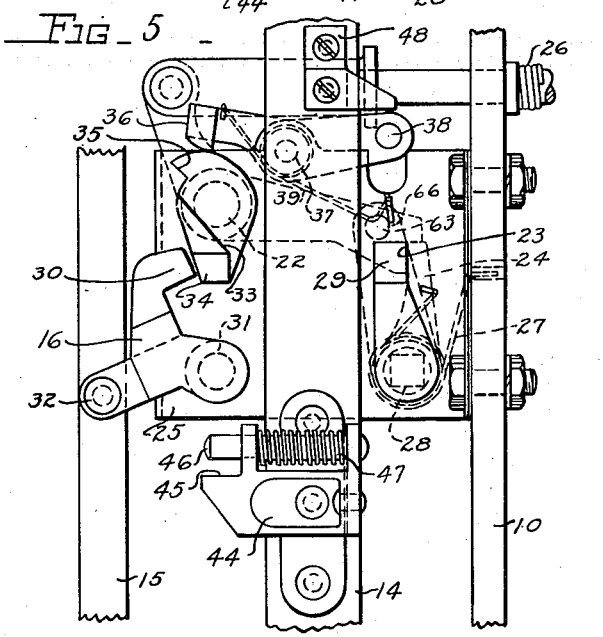
Figure 5 is an elevation view showing the mechanism of a station in the cocked position.

Referring to Figures 1, 2, 3, and 4, it will be seen that the selector bar 14 is provided with a rack gear 40 at its upper end which engages the teeth of a gear element 41 on the torque tube 11. The bar 14 is maintained in slidable aligned relation with the station boxes 25 by means of a roller guide 42, Figure 4 and the cleats 43 (shown in Figure 4 but not shown in Figures 5 to 10) rigidly attached to the boxes 25. Rigidly mounted on the bar 14 is a transversely extending lug 44 for each station which is designed with a portion 45 arranged to engage, on upward motion of the bar, the shoulder portion 34 of the lug 33 when the station is in the cocked position seen in detail in Figures 5 to 10. Also provided on the lug 44 is a slidable pin 46 which is of such length as to substantially occupy the distance between the hammer 30 of the trigger 16 and the trip arm 29 when the bar has been moved into station conditioning relation (Figure 7). A coil spring 47 urges the pin towards the trigger 16. These lugs 44 and the corresponding lugs on the companion rack are so spaced on the station selector bar 14 that but one of them will bring its pin into alignment with the trigger 16 and the trip arm 29 at one time and also spaced so that station 1 is first conditioned, then station 2, station 3, and station 4, in succession. It is therefore obvious that but one station can be released at a time by the tripping means 13, since but one station at a time can be conditioned for release. The station selector bar is further provided with a lug 48 for each station which is so spaced and arranged as to engage the transversely protruding pin 38 of the hook 36 of each station when the station selector bar 14 is pulled into its furthermost down position. This engagement of the protruding pins 38 serves to unlock the hooks 36 of each station and allows releasing devices of the stations to be cocked. The station selector bars of the two hangers are made to operate as a unit by means of the torque tube connection and the gear segments 41 engaging the rack teeth 40 of the station selector bars.

The tripping bar 15 is operated by a solenoid 49 mounted on the rear of the framework 10, as illustrated in Figure 3, having its plunger 50 pivotally connected by a V-knuckle link element 51, as seen in Figure 18, to a link rod 52 which is tangentially pivotally connected at 53 with an annular plate 54 mounted on an inner shaft of the torque shaft assembly so as to actuate a companion annular member to which is similarly attached the tripping bar 15 at the right hand hanger B. The tripping bar 15 is directly connected to the annular plate 54 at a point 55 tangent to the bar. Reciprocation of the solenoid is therefore seen to cause the tripping bar to oscillate up and down, thereby moving the triggers 16 at each station so as to release the conditioned station.

Where vertical space is not a determining factor, it is obvious that the solenoid may be mounted directly above the tripping bar with its direction of motion coextensive with the direction of motion of the tripping bar, thereby saving parts.

In the rack illustrated, the solenoid is mounted on a mounting plate 56 (Figure 18) which is adapted for the mounting of a second solenoid on the base 57, the second solenoid thereby being disposed at right angles to the first. This is designed for the operation of a second bomb rack assembly adjacent the first assembly, when desired.

On the opposite side of the station box 25, from which is mounted the station selector bar 14 and tripping bar 15 is mounted a bar 58 which is constructed so as to serve as the salvo means for tripping all stations substantially simultaneously upon movement thereof in one direction and serves as the means for simultaneously locking all stations against tripping or release upon movement thereof in the opposite direction, with provision of a neutral position intermediate said end positions wherein the stations may be tripped individually by the tripping means 13. This bar is mounted in vertical slidable arrangement with the stations by the engagement of a fixed pin 59 in a vertical slot 60 of the bar at each station. At each station is a lateral extension 61 of the salvo bar 58 containing the vertically disposed slot 62 which is adapted to engage a movable pin 63 at either its upper or lower ends, and is provided with an enlarged intermediate portion in which the movable pin 63 may be laterally moved, within limits, without restraint. This intermediate position of the bar is termed the selective position and corresponds to the position so calibrated on the lever guide 64 of the manual control 65, hereinafter more fully described. The movable pin 63 protrudes transversely from an arm 66 (best seen in Figures 8 and 13) which is rigidly attached to the shaft 28 to which is attached the trip arm 29 and latch 24. It is thereby seen that the arm 66 to which the pin 63 is attached moves with the trip arm 29 and latch 24 and that engagement of the pin 63 with the cam surface 67 at the upper end of the slot will cause the pin to be urged toward the center of the station box and prevent the trip arm or latch from motion in the opposite direction, thereby locking the station action against tripping, which position is called the locked position. On the other hand, on the upward motion of the bar, the pin 63 will be engaged by the cam surface 68 at the lower half of the slot and forced into the notch 69 of the salvo bar, thereby urging the pin and its arm away from the center of the station box and causing the tripping of all stations, just as if the trip arm 29 of each station had been moved in response to the trigger 16 of the tripping bar 15. This is called the salvo position of the bar and the resulting effect is called the salvo action. These slots 62 are arranged at each station so as to lock all stations simultaneously and to release all stations substantially simultaneously. Preferably the several cams 68 are so spaced that lower stations are released slightly in advance of the next station above so that a stripping action, or successive releases, occurs. The mechanism 65 for operating the salvo bar is preferably manual and as illustrated comprises a handle 70 rigidly attached to a shaft 71 having a rigid arm 72 which is connected by means of a link rod 73 to an arm 74 on the torque tube housing. In practice, the manual handle control is located in the cockpit and suitably connected to the control shaft 71 at the bomb rack. On the opposite side of the torque tube housing is an extension of the arm 74 which is pivotally connected at 75 to a link rod 76 attached to the salvo bar 58. Through the positive connection of the torque tube, the salvo bar at the right-hand hanger is enabled to operate in unison with the salvo bar at the left-hand hanger.

Locking means shown in Figures 14 to 17, inclusive, are provided to hold the station selector bar in the furthermost down or initial position. As previously pointed out, the spring housing or cocking bar 17 is rigidly attached to the station selector bar 15. The actuating power for the station selector bar is obtained by mounting a compression spring 77 in the upper end of this housing, with its lower end supported by a bracket 78 rigidly attached to the rack supporting framework 10. When the station selector bar is pulled into its furthermost down position, the spring is compressed under a strong potential energy to the position shown in Figure 14. As the spring actuates the bar upwardly, the housing moves upwardly and the bracket 78 moves relatively downward of the housing in the slot 79 in which the flat portion of the bracket enters the housing.

Heretofore, there has not been provided, in bomb racks of this character, any independent means for holding the station selector bar in said initial or lowermost position, but rather, the artifice employed has been for the operator to pull down the bar with one hand, and while holding it down, to cock the first desired station, so that the bar could be allowed to abut itself against this first cocked station, which incidentally, was therefore automatically conditioned for release. In the case of large bomb racks, or in the event that it was desired to cock only higher stations in the rack, it is obvious that one man was unable to perform both the above described functions, so then it became necessary to have additional help in loading the rack, making it at least a two-man job. It is also necessary, in our bomb rack, because of the hook arrangement for locking each individual station against cocking instantaneously with its release, that the station selector bar 14, when it carries the means for unlocking the anti-cocking device at each station, be held in this furthermost down position during the cocking of all the stations, in order that the pins 38 of the lock members 36 will be engaged by the lugs 48. As announced in the objects, we have solved this difficulty by the provision of a locking means to be now more fully described.

In the bracket which supports the spring is provided a journal 80 in which is mounted one end of a shaft 81, the other end of said shaft being mounted in a journal 82 of a bracket 83 rigidly attached to the rack framework 10 at the vicinity of the salvo bar 58, a portion of which is seen in Figures 15 and 16.

On the end of the shaft 81 near the spring housing is rigidly attached an arm 84 intermediate of its ends with one end 85 acting as a stop and the other end having a lug 86 with an upwardly presenting bevel face 87 and a lower presenting flat abutment. The lug 86 is aligned with a sear 89, rigidly attached to the housing 17 as by welding, so that when the housing and station selector bars are pulled downward, the sear 89 engages the bevelled face 87 (Figure 17), displacing it until the sear has passed below the lug, when the arm 84 and lug return to the normal position in response to the actuation of spring 90, with the sear 89 abutting the lug 86 as seen in Figure 14. The spring 90 is looped around a short projecting arm 91 of the shaft 81 and normally maintains the end 85 of the lug bearing arm 84 in abutment with the framework 10. Since the parts 85, 86, 89, 90, etc., function to detain the selector from moving from the starting position to the first unit until the first unit can be cocked, these parts may be collectively referred to as the releasable detention means. An adjustable stop 92 is provided to prevent pulling the spring housing and station selector bar assembly far beyond the locking lug 86. This stop is in the form of a bolt 93 threaded in lug 94 rigidly secured to the spring housing 17 and disposed in aligned relation with the plate portion 95 of the bracket 78.

To release the spring housing bar 17 and station selector bar 14 from this initial position to the conditioning position for the first cocked station, there is provided a rigidly attached arm 96 on the opposite end of the shaft 81, said arm having a notch 97 in alignment with a sear 98 secured to the salvo bar 58, so that upon the appropriate operation of the salvo bar, the sear 98 will engage the notch 97 of arm 96 moving it to the dotted position shown in Figure 16, at which time, the lug 86 on the arm 84 on the opposite end of the shaft, is correspondingly moved out of the path of the sear 89 attached to the spring housing 17, thereby permitting the upward motion of the station selector bar.

The operation of the bomb rack is as follows:

To load the rack, first, assure that all stations are in the released position, by moving the manual control lever 70 into the salvo position indicated on the guide 64 (Figure 2). This is important in the event that the bomb rack is not to be loaded to capacity, for in that instance, an unreleased station might mean that a bomb was still contained therein and would interfere with the new predetermined plan of loading; also the bomb might interfere with the order of dropping or might inadvertently be allowed to remain in the rack upon returning from a bombing operation, with the attendant risk of danger in landing. Next, place the manual control 70 in the selective position also indicated on the guide 64. The station selector bar 14 is now pulled into the furthermost down position by means of the cocking handle 18, attached to the spring housing bar 17. Then the lug 86, located at the spring housing bar, automatically functions, as explained above in connection with Figures 14–17, to hold the bar in this position. The downward motion of the bar has caused the lugs 48 to engage the pins 38 at each station, thereby unlocking each station to permit its cocking, as shown in Figure 10. Next, the stations which are desired to be loaded with bombs are manually cocked and then the salvo bar is moved into the locked position to hold the stations locked in protection against any inadvertence in the operation of releasing mechanism. With the movement of the salvo bar into the locked position, the lug 86 holding the selector bar in its initial or furthermost down position is released by virtue of engagement of the sear 98 with the notch 97 on the trip arm 96, as shown in dotted line in Figure 16. The selector bar 14 is thereby permitted to move upwardly until the portion 45 of the lug 44 engages the shoulder 34 of the lug 33 at the first cocked station, and thereby conditions that station for release, as in Figures 2 and 7. The bombs are then placed in the rack and secured by means of the shackles, not shown, and the rack is now ready for bombing operations. The manual control 70 for the salvo bar 58 is moved into the selective position, and thereafter the first push of the switch button (not shown) for the solenoid circuit, causing the tripping bar to oscillate in response to action of the solenoid 49, will now cause the hammer 30 to engage the pin 46 (Figure 9), which in turn depresses the trip arm 29, causing the latch 24 at this station to disengage and allowing the spring 26 to move the release lever 20 to the right so as to drop the bomb. As the latch is moved out of the notch 23 in the arm 21 to which the link rod 19 is attached, the movement of the release lever 20 to the right causes a clockwise rotation of the lug 33 on the journal 22. This rotation causes the projecting shoulder 34 of the lug 33 to disengage the portion 45 of the lug 44 on the station selector bar and the station selector bar moves further upward under the actuation of the spring 77 in the spring housing until the portion 45 of the lug 44 on the station selector bar engages the shoulder portion 34 of the next corresponding lug 33 at the next cocked station, thereby conditioning that station for next releasing.

In this manner each of the cocked stations is conditioned for release and released in successive lowermost order. Any uncocked station is automatically passed by.

At the same time that the lug 33 rotates in a clockwise direction with the latch engaging arm 21 in response to the actuation of the spring 26 on the link rod 19, and thereby moves its shoulder 34 out of the path of the lug 45 on the station selector bar, the notch 35 on the opposite end of the lug 33 comes into registry with the hook 36. Thereafter, the station is locked against cocking until the station selector bar is pulled into its furthermost down position, at which time the lugs 48 engage the pins 38 attached to the opposite end of the hooks 36 and lift the hooks out of registry from the notches 35 on the lugs 33, as previously described in connection with the loading of the rack.

While we have illustrated and described our novel bomb rack in detail, for a four station rack, we wish it to be understood that our invention is not limited to the precise details and construction shown, but includes such modifications and changes as do not depart from the spirit thereof or from the scope of the appended claims.

We claim:

1. A bomb rack comprising a frame, a plurality of bomb releasing units carried on said frame, any selected number of said units being actuable from an uncocked to a cocked state, latch means carried on the frame for holding the selected units in the cocked state, selector means mounted on said frame and movable from one to the next of the cocked releasing units, stops carried on the frame for halting the selector at each cocked releasing unit in position for its release, coacting tripping means, including an element supported on the frame and an element on the selector means, arranged for tripping the latch means on that one only of the units selected for release, means operative by tripping of the latches to successively release the selector from the stops, and catch means on the frame for holding any uncocked units out of operative reach of said selector.

2. A bomb rack comprising a frame, a plurality of bomb releasing units carried on said frame, any chosen number of said units being actuable from an uncocked to a cocked state, means carried on said frame for releasably retaining the cocked units in the cocked state, selector means automatically movable on said frame from a starting position to one after the other of the cocked units, means for stopping said selector means in a position for effecting the release of the unit which has been selected, cooperating tripping means comprising separate elements carried on said frame and said selector arranged for tripping only that one of the units which has thus been selected, catch means on the frame for holding the tripped units from being re-cocked until the selector is returned to said starting position, and means on said selector operative by return to its starting position to release said catch means.

3. A bomb rack comprising a frame, a plurality of bomb releasing units on said frame, each of said releasing units being separately actuable from an uncocked to a cocked state, latch means on said frame for releasably retaining the cocked units in the cocked state, selector means movably mounted on said frame and energizable by movement to a starting point for automatically moving it from one to the next of the cocked units, cooperating stop means on the frame and on the selector means for arresting said selector at each cocked unit, tripping means comprising parts on the frame and parts on the selector arranged for tripping the latch of the unit which has been so selected, catch means on the frame for holding the tripped units from being re-cocked, and means operative by movement of the selector to the said starting point to release said catch means.

4. A bomb rack comprising a frame, a plurality of bomb releasing units at spaced apart stations on said frame, one or any selected number of said units being actuable from an uncocked to a cocked state, means supported by said frame for releasably holding the cocked units in the cocked state, a selector movably supported on said frame, resilient means energizable by movement of said selector to a starting point, releasable detention means to releasably hold the energized selector at the starting point, said resilient means being operative upon release of said selector to move said releasable detention means from one to the next of the cocked units into a position for releasing the unit selected, cooperating stop means on said selector and on each unit for arresting said selector at successive cocked units, tripping elements carried on the frame, a tripping element carried on the selector, the said tripping elements being arranged to cooperate in tripping the selected unit only, and catch means on the frame operative to hold any uncocked unit uncocked until all units are uncocked.

5. A bomb rack comprising a frame, a plurality of bomb releasing units on said frame, one or any selected number of said units being actuable from an uncocked to a cocked state, means supported by said frame for releasably holding the cocked units in the cocked state, a selector movably mounted on said frame, resilient means energizable by movement of said selector to a starting point for automatically moving it from one to the next of the cocked units and into a position for effecting release of the unit selected, releasable means for stopping the selector at each successive cocked unit, tripping elements on the frame, a tripping element on the selector, the said tripping elements being arranged to cooperate in tripping the selected unit and releasing its stopping means, catch means carried on the frame for holding the tripped units from being re-cocked, and means on the selector operative by return of the selector to the starting point to release said catch means.

6. A bomb rack comprising a frame, a plurality of bomb releasing units spaced along said frame, any or all of the units being actuable one at a time from an uncocked to a cocked state, means supported by said frame for releasably holding the cocked units in the cocked state, a selector movably supported on said frame, resilient means energizable by movement of said selector to a starting point, releasable detention means to releasably hold the energized selector at the starting point, said resilient means being operative upon release of said selector to move said resilient detention means from said starting point to the first of the cocked units and into a position for releasing said first cocked unit, releasable stop means for successively arresting said selector at each cocked unit, tripping elements carried on the frame, a tripping element carried on the selector, the said tripping elements being arranged to cooperate in tripping the selected device only and in releasing its stop means, catch means for each unit carried on said frame for holding uncocked units in the uncocked state, and means on the selector operative by movement thereof to the said starting point to release all of the said catch means.

7. A bomb rack comprising a frame, a plurality of bomb releasing units carried on said frame, any or all of the units being actuable from an uncocked to a cocked state, means supported by said frame for releasably holding the cocked units in the cocked state, a selector movably supported on said frame, resilient means energizable by movement of said selector to a starting point, releasable detention means to releasably hold the energized selector at the starting point, said resilient means being operative upon release of the releasable detention means to move said selector from the starting point into tripping position with the first of the cocked units, and upon tripping of a cocked unit into tripping position with a succeeding cocked unit until all are tripped, releasable stop means for successively arresting said selector at each cocked unit, tripping elements supported on the frame, a tripping element supported on the selector, the said tripping elements being operative upon being tripped to release said stop means and being brought into cooperative relationship by movement of said selector into a tripping position, and releasable catch means operative to hold any uncocked unit uncocked until all are uncocked.

8. A bomb rack comprising a frame, a plurality of bomb releasing units carried on said frame, any or all of the units being actuable from an uncocked to a cocked state, means supported by said frame for releasably holding the cocked units in the cocked state, a selector movably supported on said frame, resilient means energizable by movement of said selector to a starting point, releasable detention means to releasably hold the energized selector at the starting point, said resilient means being operative upon release of said releasable detention means to move said selector from the starting point into tripping position with the first of the cocked units and upon tripping of a cocked unit into tripping position with a succeeding cocked unit until all cocked units are tripped, releasable stop means for arresting said selector at each cocked unit, tripping elements supported on the frame, a tripping element supported on the selector, the said tripping elements being brought into cooperative relationship to trip said cocked unit and release said stop means by movement of said selector into a tripping position, power means to operate the tripping means and means to control the power means.

9. A bomb rack comprising a frame, a plurality of bomb releasing units carried on said frame, said units being separately actuable from an uncocked to a cocked state, a latch means for each unit supported on said frame for releasably holding the cocked units in the cocked state, a selector movably supported on said frame, resilient means, energizable by movement of said selector to a starting point, for moving said selector from one to the next of the cocked devices, releasable detention means for releasably holding said selector at the starting point, a stop on each of said units, cooperating stops on the selector for engaging said unit stops to arrest said selector in positions for tripping said latch means, said unit stops being movable out of engagement range of said selector stops by said units upon actuation of said units to the uncocked state, whereby no uncocked units may be selected, control means for operating said releasable detention means releasing said selector from its starting point for movement of the selector to engage the unit stop of the first cocked unit with a selector stop, and coacting tripping elements on the frame, the latch and the selector, arranged for tripping that one only of the units which has been selected.

10. A bomb rack comprising a frame, a plurality of bomb releasing units spaced apart on said frame, said units being individually actuable from an uncocked to a cocked state, a latch means for each said unit supported on said frame for releasably holding the cocked devices in the cocked state, a selector movably supported on said frame, resilient means energizable by movement of said selector to a starting point, said resilient means, when energized, being adapted to move said selector from the starting point to the first cocked unit and successively to the remaining cocked units, means to releasably hold said selector at the starting point, a stop on each of said units, cooperating stops on the selector for engaging said unit stops to arrest said selector in proper positions for successively tripping said units, said unit stops being movable out of engagement range of said selector stops by said units upon actuation of said units to the uncocked state, whereby no uncocked units may be selected, control means for releasing said selector from its starting point for movement of the selector to contact the unit stop of the first cocked unit with a selector stop, and tripping mechanism for tripping said latches comprising a tripping part on each latch, coacting tripping parts on the frame for each latch and coacting tripping parts on the selector, brought into operative relationship by engagement of a selector stop with a unit stop.

11. A bomb rack comprising a frame, a plurality of bomb releasing units on said frame, said units being individually actuable from an uncocked to a cocked state, a latch means for each said unit supported on said frame for releasably holding the cocked devices in the cocked state, a selector movably supported on said frame, resilient means energizable by movement of said selector to a starting point, said resilient means, when thus energized, being adapted to move said selector from the starting point to the first cocked unit and successively to the remaining cocked units, means to releasably hold said selector at the starting point, a stop on each of said units, cooperating stops on the selector for engaging said unit stops to arrest said selector in proper positions for successively tripping said latch means, said unit stops being movable out of engagement range of said selector stops by said unit upon actuation of said unit to the uncocked state, whereby no uncocked units may be selected, a tripping part on each of said latches and a tripping part on the frame for each latch and coacting tripping parts on the selector brought into operative relationship by engagement of a selector stop with a unit stop, catch means on said units and a coadjutant catch means on said frame engageable one with the other for holding a unit stop out of operative reach of its selector stop, means to release said catch means, and control means for releasing said selector from its starting point for movement of said selector to engage the unit stop of the first cocked unit by its cooperating selector stop.

12. A bomb rack comprising a frame, a plurality of bomb releasing units on said frame, said units being individually actuable from an uncocked to a cocked state, a latch means for each said unit supported on said frame for releasably holding the cocked devices in the cocked state, a selector movably supported on said frame, resilient means energizable by movement of said selector to a starting point, said resilient means, when thus energized, being constrained to move said selector from the starting point to the first cocked unit and successively to the remaining cocked units, means to releasably hold said selector at the starting point, a stop on each said unit, cooperating stops on the selector for engaging said unit stops to arrest said selector in the proper positions for successively tripping said latch means, said unit stop being movable out of engagement range of said selector stops by said unit upon actuation of said unit to the uncocked state, whereby said selector is released for movement to the next cocked unit, tripping mechanism for tripping said latches, comprising a tripping part on each latch coacting tripping parts on the frame and coacting tripping parts on the selector adapted to be stopped in operative relationship with the first said tripping parts by engagement of a selector stop with a unit stop, said frame mounted tripping parts being joined together by linkage for unitary operation, catch means on the units and coadjutant catch means on said frame engageable for holding the stop on any of the uncocked units out of operative reach of its selector stop, means operative by return of said selectors to the starting point to release said frame catch means, and control means for releasing said selector from its starting point for movement of the selector to engage the unit stop of the first cocked unit by its cooperating selector stop.

13. A bomb rack comprising a frame, a plurality of bomb releasing units on said frame, said units being individually actuable from an uncocked to a cocked state, a latch means for each said unit supported on said frame for releasably holding the cocked units in the cocked state, a selector movably supported on said frame, resilient means energizable by movement of said selector to a starting point, said resilient means, when thus energized, being constrained to move said selector from the starting point to the first cocked unit and to one after the other of the remaining cocked units, means to releasably hold said selector at the said starting point, a stop on each said unit, cooperating stops on the selector for engaging said unit stops to arrest said selector in the proper positions for successively tripping said latch means, said unit stops being movable out of engagement range of said selector stops by said unit upon actuation of said unit to the uncocked state, whereby said selector is free to move past any uncocked unit to the next cocked unit, tripping means for tripping said latches comprising spaced tripping parts for each latch mounted one on the frame and another on the latch, and coacting tripping parts on the selector adapted to be stopped in operative relationship each with the other by engagement of a selector stop with its cooperating unit stop, said frame mounted tripping parts being joined together by linkage for unitary operation, catch means on the units and coadjutant catch means on said frame engageable for holding the unit stops and the selector stops out of operative reach and the uncocked units uncocked, a plurality of means on said selector, operative by return of said selector to the said starting point to release said frame catch means, means connected to the said linkage to simultaneously operate the frame mounted tripping parts, and control means for releasing said selector from its starting point for movement of the selector to engage the unit stop of the first cocked unit by its cooperating selector stop.

14. A bomb rack comprising a frame, a plurality of bomb releasing units on said frame, said units being individually actuable from an uncocked to a cocked state and trippable from the cocked to the uncocked state, a latch means for each said unit supported on said frame for releasably holding the cocked units in the cocked state, a selector movably supported on said frame, resilient means energizable by movement of said selector to a starting point, said resilient means, when thus energized being constrained to move said selector from the starting point to the first cocked unit and to one after the other of the remaining cocked units, means to releasably hold said selector at the said starting point, a stop on each releasing unit, cooperating stops on the selector for engaging said unit stops to arrest said selector in the proper positions for successively tripping said units, said unit stops being movable out of engagement range of said selector stop by said unit upon actuation of said unit to the uncocked state, whereby said selector is free to move past any uncocked unit to the next cocked unit, tripping means for tripping said latches comprising spaced tripping parts for each latch mounted one on the frame and another on the latch and coacting tripping parts on the selector adapted to be stopped in operative relationship with the spaced tripping parts by engagement of a selector stop with its cooperating unit stop, said frame mounted tripping parts being joined together by linkage for unitary operation, a catch on each unit and coadjutant catches on said frame engageable one with the other for holding the stops of a unit and the selector out of operative reach and the uncocked units uncocked, control means on said frame comprising means operable to one position for tripping the latch means of all units at once and to another position for releasing said selector from its starting point for movement of the selector to engage the unit stop of the first cocked unit by its cooperating selector stop, a plurality of means on said selector, operative by return of said selector to the said starting point to release said frame catch means, and means connected to the said linkage to simultaneously operate the said selector tripping parts.

15. A bomb rack comprising a frame, a plurality of bomb releasing units carried on said frame, each unit including a releasing lever, a releasing arm, a link rod connecting said lever and arm and a resilient means biased to hold said lever, arm and rod in an uncocked state, a latch on the frame for each said unit engageable with said arm for releasably holding the unit in the cocked state, a selector movable on said frame, a spring associated with said selector stressible by movement of said selector to a predetermined starting point and operative when so stressed to move said selector from said point to the first cocked unit and thereafter to one after the other of the remaining cocked units, means to move said selector to the said starting point, means to releasably hold said selector at the starting point, a stop operatively connected to each arm, cooperating stops on the selector for engaging said arm operated stops to arrest said selector at tripping positions, said arm operated stops being movable to a position out of operative reach of said selector stops by movement of said arm to the uncocked position, trip arms operatively connected to the latch, triggers on the frame spaced out of operative reach of said trip arms, tripping means on the selector adapted to be stopped between the triggers and the trip arms by engagement of the selector stops with the arm operated stops to operatively connect said triggers and trip arms, said triggers being joined by linkage for unitary operation, a catch operatively connected to each arm and complementary catches on the frame engageable for holding the arm operated stops in their inoperative position and the uncocked units in the uncocked state, control means on said frame, operable to one position for tripping the latches of all units at substantially the same time, and to another position for releasing said selector from its starting point, means on said selector operative by return of said selector to the said starting point to release said frame catch means, and means for operating said linkage.

16. The structure of claim 15 wherein the means to move the selector to the starting point is a manual means.

17. The structure of claim 15 wherein the means to operate said linkage is an electromagnetic means.

18. The structure of claim 15 wherein the control means is operable to one position for tripping the latches of all units at substantially the same time, to another position for releasing the selector from the starting point and to an intermediate position for unlocking all cocked units for selection and release.

LAWRENCE J. EYLER.
CHESTER C. PEARSON.